May 4, 1965
B. F. McNAMEE
3,182,248
VOLTAGE BUILDING TRANSFORMER
Filed Jan. 29, 1962
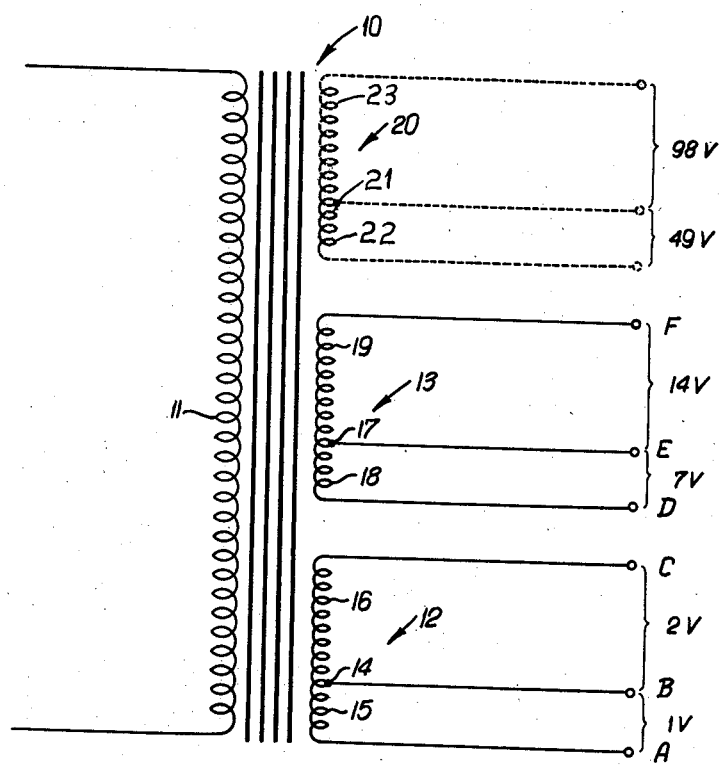
BERNARD F. McNAMEE
INVENTOR.
BY Flam and Flam
ATTORNEYS.

United States Patent Office 3,182,248
Patented May 4, 1965

3,182,248
VOLTAGE BUILDING TRANSFORMER
Bernard F. McNamee, Altadena, Calif., assignor to Dressen-Barnes Electronics Corporation, Pasadena, Calif., a corporation of California
Filed Jan. 29, 1962, Ser. No. 169,306
3 Claims. (Cl. 323—47)

This invention relates to an output transformer, such as for a power supply, whereby, without the use of sliders or switches, various output voltages can be provided. More particularly, this invention relates to a system in which a small number of taps are available for connection and shunting, for producing voltages in uniform steps throughout a substantial range.

In a prior patent to Hanthorn et al., No. 2,884,587, there is shown and described a system whereby voltages are provided in steps, two secondary windings being provided, one corresponding generally to the "tens" and the other corresponding to the "units." Each winding has taps from which two leads extend, and the taps divide the winding into five necessarily contiguous parts having the ratio of 1:2:3:4:1.

I have found that a much simpler arrangement can be provided. In order to provide the simpler arrangement, the concept of "tens" and "units" is first discarded, and a quite different and specialized numerical system adopted. In this specialized system, a plurality of windings are provided, corresponding parts of which have the ratio of seven to one, rather than ten to one as in the Hanthorn et al. patent. Each winding then has only one intermediate tap dividing the winding into parts having the ratio to each other of two to one. A two winding system, having a total of just six terminals, is capable of providing voltages in twenty four equal steps. This represents a substantial versatility in terms of the number of terminals.

Thus it is the primary object of this invention to provide a unique winding system for an output transformer whereby a wide variety of voltages are available despite the essential simplicity of the system.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawing:

The single figure is a diagrammatic view of a transformer illustrating the present invention.

There is illustrated diagrammatically a transformer 10 that may have any desired core structure. The transformer has a primary or exciting winding 11 and two secondary windings 12 and 13. The secondary winding 13 is designed to produce an output voltage precisely seven times the output voltage produced by the winding 12.

A tap 14 divides the winding 12 into two sections 15 and 16 and such that the voltage produced by the winding section 16 is precisely twice the voltage produced by the winding section 15. Similarly, the secondary winding 13 has a tap 17 that divides the winding 13 into two sections 18 and 19 and such that the winding section 19 produces precisely twice the voltage produced by the winding section 18.

The voltages produced by the winding sections 15 and 16 are, in this instance, necessarily in phase because the sections are contiguous parts of the same winding. The voltages produced by the sections 15 and 16 are therefore arithmetically additive. Similarly, the voltages produced by the winding sections 18 and 19 are in phase and additive. Furthermore, the voltages produced by the entire windings 12 and 13 are either in phase or 180° out of phase so that they, too, are capable of arithmetic addition.

The output terminals of the windings are labelled A, B, C, D, E and F. In the present instance, the terminal F of the winding 13 has the same polarity relative to the lower terminal D as the upper terminal C of the winding 12 has to the terminal A.

The voltage produced by the winding section 15 corresponds to the fundamental building block or unit for the output transformer.

Although any voltage may be provided, depending on the design of the system, an understanding of the present invention is facilitated by assuming that the winding section 15 produces a one volt output. This means that the winding section 16 produces two volts by virtue of the specific division of the winding 12 achieved by the tap 14. Since the windings 13 and 12 have the ratio of 7 to 1, then the winding 13 must produce at terminals F and D a total of twenty one volts, that is, seven times the three volt output of the winding 12. The winding section 18 provides seven volts, and the winding section 19 provides fourteen volts.

Voltages from one to twenty four may be obtained by a cumulative or differential arrangement of the several winding sections and based upon building units having a ratio of 1, 2, 7 and 14. All of the required voltages in steps of one volt can be created as follows:

| | |
|---|---|
| 1 | 1 |
| 2 | 2 |
| 3 | 2+1 |
| 4 | 7−(2+1) |
| 5 | 7−2 |
| 6 | 7−1 |
| 7 | 7 |
| 8 | 7+1 |
| 9 | 7+2 |
| 10 | 7+2+1 |
| 11 | 14−(2+1) |
| 12 | 14−2 |
| 13 | 14−1 |
| 14 | 14 |
| 15 | 14+1 |
| 16 | 14+2 |
| 17 | 14+2+1 |
| 18 | 14+7−(2+1) |
| 19 | 14+7−2 |
| 20 | 14+7−1 |
| 21 | 14+7 |
| 22 | 14+7+1 |
| 23 | 14+7+2 |
| 24 | 14+7+2+1 |

In order to accomplish these additions, it is merely necessary to derive the output voltage from the terminals F, E, D, C, B and A in an appropriate manner, and utilizing a jumper in certain cases. The following is a tabulation of the manner in which the desired voltages can be obtained.

| Voltage Output | Terminals to Which Output Leads Are Connected | Jumper |
|---|---|---|
| 1 | AB | None. |
| 2 | BC | None. |
| 3 | AC | None. |
| 4 | CE | AD. |
| 5 | CE | BD. |
| 6 | BE | AD. |
| 7 | DE | None. |
| 8 | AE | BD |
| 9 | BE | CD. |
| 10 | AE | CD. |
| 11 | CF | AE. |
| 12 | CF | BE. |
| 13 | BF | AE. |
| 14 | EF | None. |
| 15 | AF | BE. |
| 16 | BF | CE. |
| 17 | AF | CE. |
| 18 | CF | AD. |
| 19 | CF | BD. |
| 20 | BF | AD. |
| 21 | DF | None. |
| 22 | AF | BD. |
| 23 | BF | CD. |
| 24 | AF | CD. |

In order to avoid short-circuiting any winding section, two related criteria exist.

First, in any one winding, the difference between the voltages produced by the separate sections of any one winding must never be required. This criterion is satisfied by using sections having the ratio of 2 to 1. Thus, in order to provide voltage outputs of 1, 2 and finally the full range of the winding section, namely, 3, it is unnecessary to subtract the voltage produced by the one-volt winding section 15 from the two-volt winding section 16. Thus, the winding section 12 alone produces the one-volt output. Similarly, a 2-to-1 ratio exists in the winding 13 as between the winding sections 19 and 18 and for the same purpose. Accordingly, if one, rather than both, of the winding sections of a single winding is utilized, the other winding section is left open circuited.

The second criterion is that no non-contiguous sections of the same winding should ever be jointly used. Thus, for example, if there were a single winding providing sections having a ratio of 1, 2 and 7, then at times an addition would be required between non-contiguous sections, namely, the seven-volt section and the one-volt section, to produce an output of eight volts. This would cause a short circuit in the intermediate section. This criterion is here uniquely satisfied by providing only two sections for any single winding. This means that there are in fact no non-contiguous sections of the same winding since there are only two.

If outputs higher than twenty-four volts are required, that is, if more than twenty four steps are required, a third winding 20, as illustrated in phantom line, may be provided. The winding 20 produces an output voltage seven times that of the winding 13, namely, 147 volts. A tap 21 divides the winding into two sections 22 and 23, producing, in this instance, voltages of 49 and 98 volts, respectively. For each additional winding, the number of possible increments is multiplied approximately by a factor of seven. The manner in which the voltages are added either cumulatively or differentially is, in essence, the same, and a detailed description is believed unnecessary.

The inventor claims:

1. An adjustable transformer comprising a magnetic core having a primary winding and a plurality of secondary winding sections, said secondary winding sections having accessible terminals for selective interconnection thereof to provide a composite secondary winding, said secondary winding sections having turn ratios respectively proportional to the numbers of the series 1, 2, 7, 14, 49, 98, 343, 686 . . . such that cumulative and differential connection of selected winding section terminals provides any voltage proportional to the numbers of the series 1, 2, 3, 4, 5, 6, . . .

2. An adjustable transformer comprising a magnetic core having a primary winding and a pair of secondary windings having turn ratios related as the numbers seven to one, each winding having separate end terminals and an intermediate terminal dividing the corresponding winding into sections having turn ratios to provide voltages in the ratio of two to one such that cumulative and differential connection of selected winding section terminals provides any voltage proportional to numbers of the series 1, 2, 3, 4, 5, 6, . . .

3. An adjustable transformer comprising a magnetic core having a primary winding and a plurality of secondary windings, the secondary windings having separate accessible terminals, said secondary windings having turn ratios corresponding to numbers of the series $n$, $7n$, $49n$, $343n$, . . . , and in which each secondary winding has an intermediate terminal dividing the corresponding winding into sections having turn ratios to provide voltages in the ratio of two to one such that cumulative and differential connection of selected winding section terminals provides any voltage proportional to numbers of the series 1, 2, 3, 4, 5, . . .

References Cited by the Examiner

UNITED STATES PATENTS 2,930,964 3/60 Goodman _____ 323—48
2,884,587 4/59 Hanthorn et al. _____ 323—47

LLOYD McCOLLUM, *Primary Examiner.*